United States Patent
Bhat et al.

(10) Patent No.: US 10,324,696 B2
(45) Date of Patent: Jun. 18, 2019

(54) DYNAMIC CONTAINER DEPLOYMENT WITH PARALLEL CONDITIONAL LAYERS

(71) Applicant: International Business Machines Corporation, Armonk, NY (US)

(72) Inventors: Badekila Ganesh Prashanth Bhat, Bangalore (IN); Manu T. George, Bangalore (IN); Krishna Kumar Chandrasekar, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 264 days.

(21) Appl. No.: 15/082,121

(22) Filed: Mar. 28, 2016

(65) Prior Publication Data

US 2017/0277524 A1     Sep. 28, 2017

(51) Int. Cl.
G06F 9/44    (2018.01)
G06F 8/60    (2018.01)

(52) U.S. Cl.
CPC ..................... G06F 8/60 (2013.01)

(58) Field of Classification Search
CPC ..... G06F 8/63; G06F 8/71; G06F 8/64; G06F 11/3409
See application file for complete search history.

(56) References Cited

U.S. PATENT DOCUMENTS

| 7,444,620 | B2 | 10/2008 | Marvin | |
| 9,361,595 | B2* | 6/2016 | Karve | G06Q 10/06315 |
| 2003/0078960 | A1* | 4/2003 | Murren | H04L 29/06 709/203 |
| 2005/0198628 | A1* | 9/2005 | Graham | G06F 8/63 717/174 |
| 2008/0141234 | A1 | 6/2008 | Becker et al. | |
| 2012/0203823 | A1* | 8/2012 | Manglik | G06F 9/5072 709/203 |
| 2013/0339510 | A1* | 12/2013 | Douglas | H04L 41/5077 709/223 |
| 2016/0350081 | A1* | 12/2016 | Kumar | G06F 8/30 |
| 2016/0381075 | A1* | 12/2016 | Goyal | H04L 63/20 713/176 |

(Continued)

OTHER PUBLICATIONS

Neil Brown, Overly Filesystem, Nov. 7, 2015—, <neilb<at>suse.de>, 4 pages.

(Continued)

*Primary Examiner* — Duy Khuong T Nguyen
(74) *Attorney, Agent, or Firm* — Cuenot, Forsythe & Kim, LLC

(57) ABSTRACT

A method and associated systems for dynamic container deployment with parallel layers. A processor creates an image file by processing each instruction of an image-container file in sequential order, where each instruction adds a layer to the image file that identifies either an unconditional or a parallel software layer of a container. Each unconditional layer is assigned a unique level but parallel layers may share a same level. The processor then deploys an instance of a container by deploying layers of the image file to the container in the order in which they were created by the image-creation file. If an image-file layer is marked as parallel, it is deployed only if an associated condition is satisfied, such that no two deployed layers have the same level.

17 Claims, 9 Drawing Sheets

(56) References Cited

U.S. PATENT DOCUMENTS

2017/0052807 A1* 2/2017 Kristiansson ............. G06F 9/54
2017/0177877 A1* 6/2017 Suarez ................ G06F 16/2455

OTHER PUBLICATIONS

Peter Wayner, First look: Docker is a better way to deploy your apps, An open source Linux container engine taking the world by storm is the newest, leanest, and cleanest way to get your app from development to production, InfoWorld, Mar. 5, 2014, 6 pages.
Cisco, redhat, Linux Containers: Why They're in Your Future and What Has to Happen First, 2014 Cisco, pp. 11 pages.
GitHub, flatten images—merge multiple layers into a single one #332, unclejack opened the issue on Apr. 4, 2013, 48 pages.

* cited by examiner

US 10,324,696 B2

DYNAMIC CONTAINER DEPLOYMENT WITH PARALLEL CONDITIONAL LAYERS

TECHNICAL FIELD

The present invention relates to adding conditional-deployment functionality to software container platforms.

BACKGROUND

A software container can automate and simplify a deployment of a software application in a virtualized operating environment, such as a cloud-computing platform or in a large enterprise network. A container may comprise a stand-alone computing environment in which is installed one or more configured computer applications, infrastructure, and associated software. Such a container functions as a "black box" software object that, when deployed, presents a virtualized turnkey computing environment that does not require the complex installation procedures required to provision and configure virtual infrastructure on a conventional cloud-computing or virtualized enterprise platform.

Deploying preconfigured containers may, however, not provide the flexibility needed to easily install instances of an application across an entire enterprise. When deployed across multiple platforms providers, for example, a container's predefined configuration settings cannot be varied to most efficiently accommodate each platform provider's computing environment. Some, but not all platform providers may, for example, provide built-in security services, a firewall, or other features that duplicate functionality comprised by a container. Conversely, in other cases, some platform providers may lack important features that a container expects to be available.

In yet other scenarios, a deployed application comprised by a container may require different sets of component software, configuration settings, or resources, depending on the application's lifecycle phase. Different containers might, for example, be required to deploy the application while the application was in a development, a test, or a production phase. In some cases, an application that is deployed for development purposes may require a container that includes design and development tools. If deployed for test purposes, that same application might instead require debugging software or test datasets. A container used to deploy the application in a production environment may require a set of production-oriented security policies or configuration settings. Container technology as it currently known in the art thus cannot effectively deploy the same application in all cases.

In such circumstances a developer may be forced to create and deploy multiple types of containers for a single application; to create a least-common-denominator compromise container that cannot optimize performance, resource-consumption, or functionality on every provider's platform; or to manually fine-time every container instance after it has been deployed.

Such customization may require tasks like installing and configuring additional software on top of a deployed application, thus greatly reducing the convenience and benefit of a mechanism that would otherwise automate the installation, configuration, and maintenance of complex software in a virtualized environment.

Most types of computer software support conditional instructions that let a computer program decide whether to perform conditional operations at run time. Software used to create and deploy containers, however, for reasons cited below, generally provides only rigidly defined tools and data structures that, by their nature, cannot support conditional deployment.

There is therefore a need for a way to add conditional deployment functionality to a container such that a single container may be used to deploy customized instances of an application as a function of conditions that become known at the time a container is deployed.

BRIEF SUMMARY

A first embodiment of the present invention provides a dynamic container system comprising a processor, a memory coupled to the processor, and a computer-readable hardware storage device coupled to the processor, the storage device containing program code configured to be run by the processor via the memory to implement a method for dynamic container deployment with parallel layers, the method comprising:

the processor processing instructions of an image-creation file that, when run, create an image file configured to deploy instances of a container, where each instance of the container comprises an ordered stack of layers selected from a set of deployable software layers, where each level of an ordered set of stack levels identifies one distinct layer of the ordered stack of layers, where each processed instruction of the image-creation file identifies a candidate layer that is capable of being deployed in one or more instances of the container, where each candidate layer is either an unconditional layer or a parallel layer, where a first processed instruction of the image-creation file identifies a first parallel layer of the set of deployable software layers that is associated with a first corresponding level of the ordered set of stack levels, and where a first instance of the container comprises the first parallel layer only if the first instance is deployed on a virtualized platform that satisfies a condition associated with the first processed instruction.

A second embodiment of the present invention provides a method for dynamic container deployment with parallel layers, the method comprising:

a processor of a computerized dynamic container system processing instructions of an image-creation file that, when run, create an image file configured to deploy instances of a container, where each instance of the container comprises an ordered stack of layers selected from a set of deployable software layers, where each level of an ordered set of stack levels identifies one distinct layer of the ordered stack of layers, where each processed instruction of the image-creation file identifies a candidate layer that is capable of being deployed in one or more instances of the container, where each candidate layer is either an unconditional layer or a parallel layer, where a first processed instruction of the image-creation file identifies a first parallel layer of the set of deployable software layers that is associated with a first corresponding level of the ordered set of stack levels, and where a first instance of the container comprises the first parallel layer only if the first instance is deployed on a virtualized platform that satisfies a condition associated with the first processed instruction.

A third embodiment of the present invention provides a computer program product, comprising a computer-readable hardware storage device having a computer-readable program code stored therein, the program code configured to be executed by a dynamic container system comprising a processor, a memory coupled to the processor, and a computer-readable hardware storage device coupled to the processor, the storage device containing program code configured to be run by the processor via the memory to implement a method for dynamic container deployment with parallel layers, the method comprising:

the processor processing instructions of an image-creation file that, when run, create an image file configured to deploy instances of a container, where each instance of the container comprises an ordered stack of layers selected from a set of deployable software layers, where each level of an ordered set of stack levels identifies one distinct layer of the ordered stack of layers, where each processed instruction of the image-creation file identifies a candidate layer that is capable of being deployed in one or more instances of the container, where each candidate layer is either an unconditional layer or a parallel layer, where a first processed instruction of the image-creation file identifies a first parallel layer of the set of deployable software layers that is associated with a first corresponding level of the ordered set of stack levels, and where a first instance of the container comprises the first parallel layer only if the first instance is deployed on a virtualized platform that satisfies a condition associated with the first processed instruction.

BRIEF DESCRIPTION OF THE DRAWINGS

FIG. 4b shows a level structure of an image file created by the image-creation file 400 of FIG. 4a.

FIG. 5b shows a level structure of an image file created by the image-creation file 500 of FIG. 5a.

DETAILED DESCRIPTION

Figure 1:
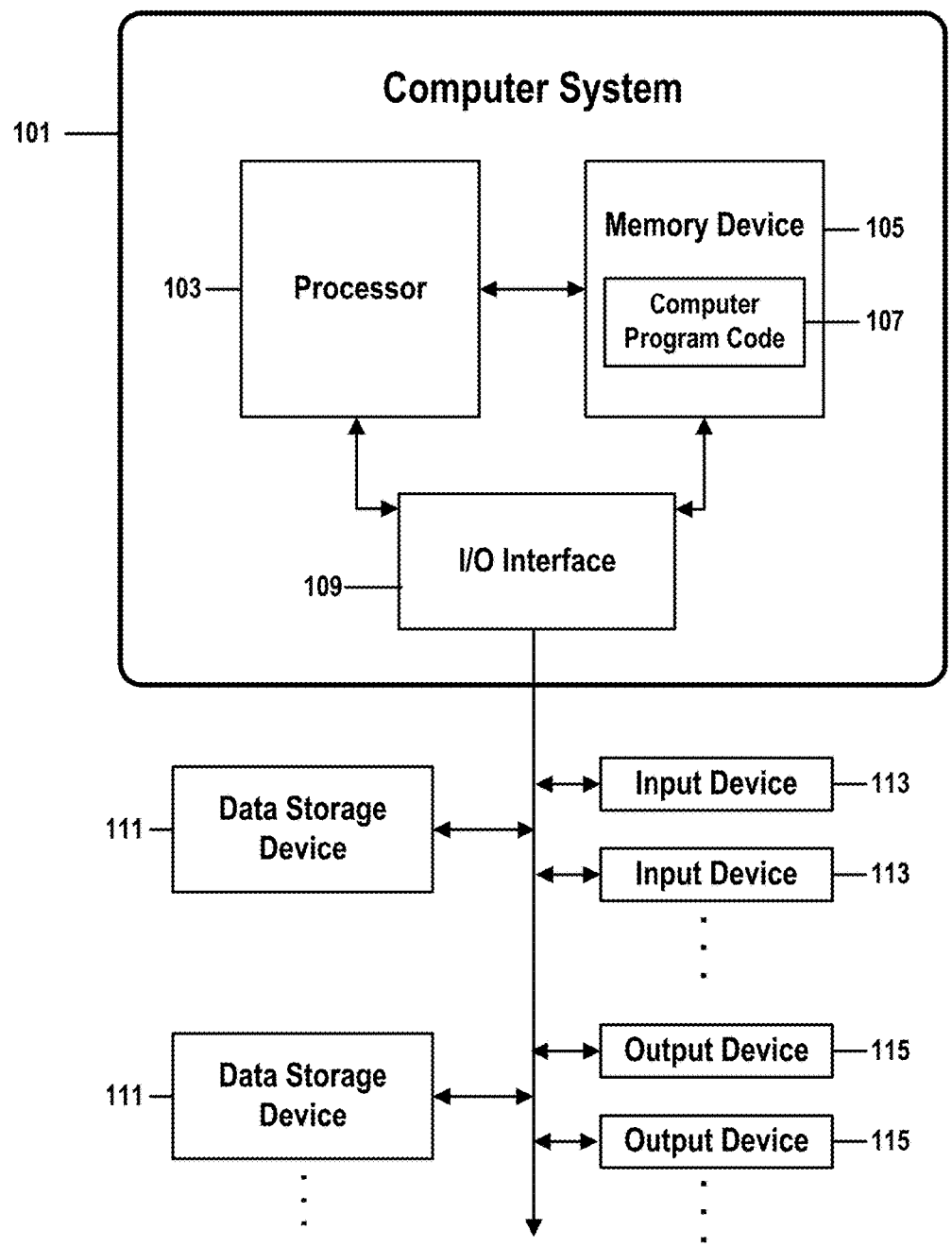
FIG. 1 shows a structure of a computer system and computer program code that may be used to implement a method for method for dynamic container deployment with parallel conditional layers in accordance with embodiments of the present invention.

Embodiments of the present invention teach a way to add conditional-deployment functionality to a software container system. Such embodiments provide a technical solution to a technical problem that is unique to computerized container technology and do not merely automate long-held practices of human behavior. Instead, they solve a problem intrinsic to container technologies, which by their nature provide no way to support conditional deployment, by providing a way to more efficiently and flexibly manipulate physical software objects, such as image files that comprise stacked layers of software images.

Embodiments of the present invention may be used to add functionality to any sort of container-creation or -deployment technology, platform, or service or to similar object-oriented deployment tools or applications. In order to more clearly explain the operation and context of the present invention, however, examples described in this document refer to containers and functionality associated with the open-source "Docker" technology, which is, at the time of the filing of this patent application, the best-known mechanism for creating, managing, and deploying software containers. Nonetheless, the use of Docker-based examples herein should not be construed to limit embodiments of the present invention to the Docker platform.

Before proceeding to a detailed description of the present invention, this document will first present a brief overview of container technology (as exemplified by the Docker platform) in order to provide context to readers who may not be familiar with container services. Other container technologies, platforms, services, and development applications may comprise similar or analogous data structures and procedures.

A Docker "container" is a self-contained operating environment that comprises one or more software applications and context, such as configuration settings, supporting software, a file system, and a customized computing environment. The container may be structured as a stack of software layers, each of which occupies one corresponding level of the stack.

A Docker container is created, or "deployed" by running an image file that contains or references each layer of the container. An image file may be used many times to deploy many identical containers, and container technologies are thus most often used to quickly install identical copies of a standard operating environment in a large enterprise or cloud-based computing environment. For this reason, Docker image files are not allowed the ability to conditionally install variations of a container. Every deployed container can be relied upon to be identical.

A Docker image file is created by running a "Dockerfile" image-creation, which comprises a set of computer instructions that define a predefined state of the container. Each instruction in an image creates a "layer" of software in the image file that, when the image file is used to deploy an instance of the container, adds one more resource, level of functionality, or configuration setting to the container.

If, for example, a container is intended to deploy a word-processing application on a particular type of virtualized platform, a corresponding Docker image may contain layers of software that, when deployed: create an instance of the word-processing application on that platform; create a file structure that lets users store documents; automatically launch the word processor; and store an interactive help file that may be viewed from within the application. A first layer of this image might load an operating system, a second layer allocate and mount a file system, a third layer install the application, a fourth layer configure the application, and a fifth layer load and launch the application load and automatically display the help file.

Deployment of such a container would thus automatically create a turnkey operating environment in which the word-processor application is configured and launched with a displayed help file under a virtual operating system configured with a file system tailored for use by a word-processor user. This would have been performed by deploying the contents of each software layer of the image file in sequential order. Again, as known in the art, this deployment is a sequential process designed to quickly install large numbers of containers with low overhead. No conditional-deployment or deployment-time tuning is possible.

Docker allows users to author and run "Dockerfile" image-creation files that each comprise predefined sets of instructions, each of which can add a layer to an image file. A Dockerfile may, for example, build an image that in turn deploys an instance of a predefined container within which a user may work. In other words, Dockerfiles build images that in turn create containers, where a container is a standardized operating environment within which a user may access a preconfigured application.

A standard Dockerfile may thus be used to create a standard image for a particular application or operating environment. Such a standard image-creation file or standard image may be derived from one or more previously created standard or "base" files stored in online or local image libraries. A container that deploys a common application in a standard configuration may therefore be implemented by simply running a standard, publicly available Dockerfile or by deploying a standard, publicly available image file. But experienced Docker users may create a custom Dockerfile that adds layers to a standard image-creation file or image file in order to build a custom image that will deploy a more specialized container.

As mentioned above, Dockerfiles, and similar entities supported by other container technologies, do not support conditional statements that would allow a single image file to create more than one variation of a standard container. So every time a particular Dockerfile is run under Docker, the Dockerfile must build the same image and that image must deploy a container that comprises exactly the same layers. Docker, therefore, does not natively support conditional deployment of containers as a function of environmental parameters, platform characteristics, or functional properties or requirements of an application. This is a serious technical constraint that can greatly limit the ability of a container technology to accommodate a large-scale deployment that comprises more than one platform or functional requirement.

Embodiments of the present invention provide a technical solution to this technical limitation of container technology by allowing the creation of adaptable self-configuring container images that determine, at deployment time, which layers to deploy. Such conditional image files select which layers to deploy as a function of a state of a condition at the time the container is deployed by means of a method of parallel layers. Such parallel layers share a common stack level in an image file, but when that image file is used to deploy a container, only one parallel layer is selected for each level, such that the deployed instance of the container comprises one layer per level.

Such embodiments may therefore facilitate conditional, dynamic container deployment, where variations of a container may be automatically selected and deployed as a function of extrinsic conditions known at deployment time, and where each variation is adapted to a particular platform, environment, or other context associated with each image-file layer as a function of novel instructions of the image-creation file associated with the image file.

FIG. 1 shows a structure of a computer system and computer program code that may be used to implement a method for method for dynamic container deployment with parallel conditional layers in accordance with embodiments of the present invention. FIG. 1 refers to objects 101-115.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for dynamic container deployment with parallel conditional layers in accordance with embodiments of the present invention, and may implement other embodiments described in this specification, including the methods illustrated in FIGS. 1-9. The data storage devices 111 may store the computer program code 107. Computer program code 107 stored in the storage devices 111 is configured to be executed by processor 103 via the memory devices 105. Processor 103 executes the stored computer program code 107.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for dynamic container deployment with parallel conditional layers.

Any of the components of the present invention could be created, integrated, hosted, maintained, deployed, managed, serviced, supported, etc. by a service provider who offers to facilitate a method for dynamic container deployment with parallel conditional layers. Thus the present invention discloses a process for deploying or integrating computing infrastructure, comprising integrating computer-readable code into the computer system 101, wherein the code in combination with the computer system 101 is capable of performing a method for dynamic container deployment with parallel conditional layers.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise the computer-readable hardware storage device.

While it is understood that program code 107 for dynamic container deployment with parallel conditional layers may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for dynamic container deployment with parallel conditional layers is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2:
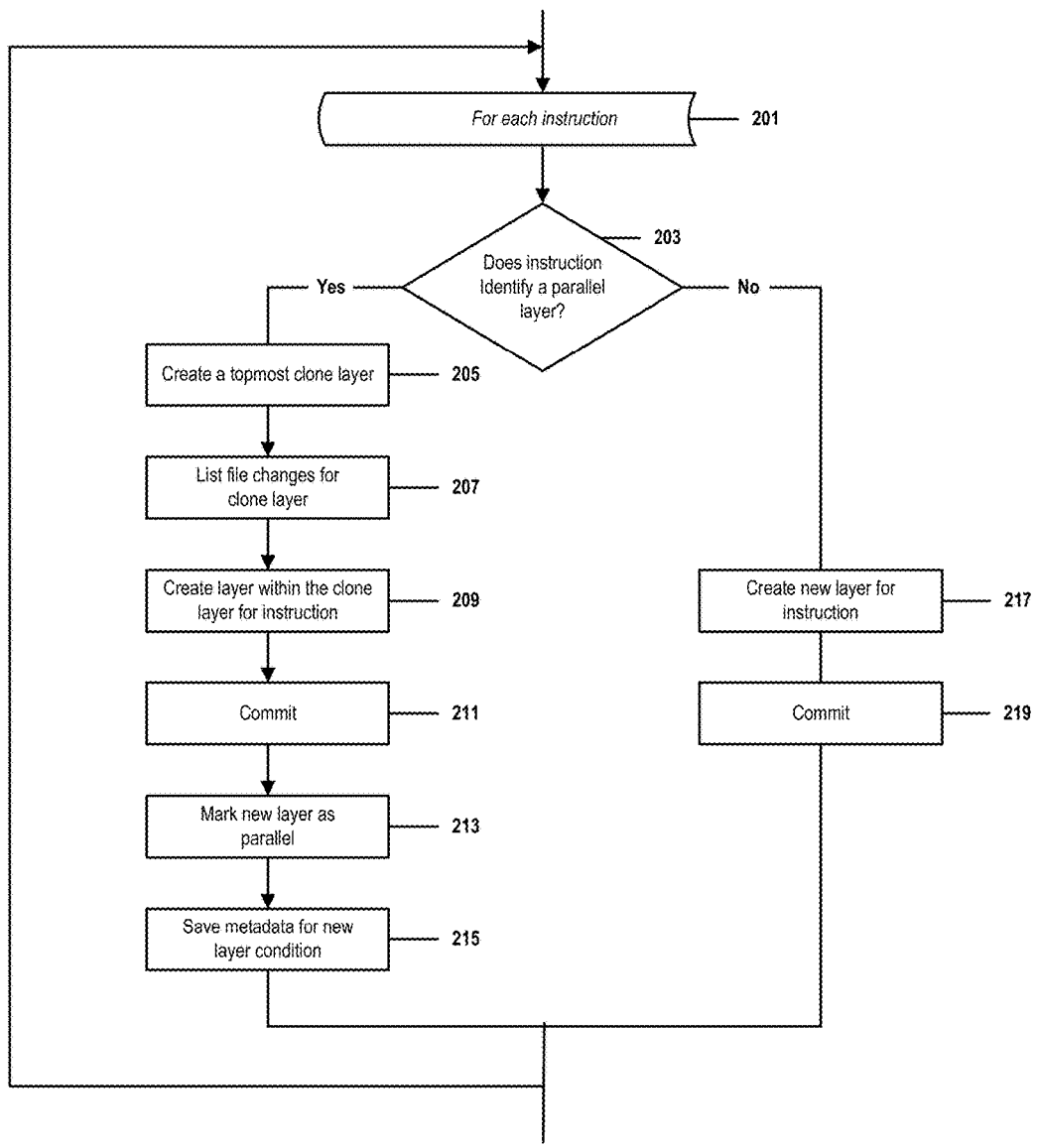
FIG. 2 is a flow chart that shows a method for creating a conditional container image in accordance with embodiments of the present invention.

FIG. 2 is a flow chart that shows a method for creating a conditional container image in accordance with embodiments of the present invention. FIG. 2 shows elements identified by reference numbers 201-219.

As described above, the method of FIG. 2 describes a method for creating a conditional container image by means of novel features added to the Docker container platform. But Docker is referenced in steps and examples described in this figure solely for pedagogical purposes because Docker is the most common container service on the market at the time that this patent was written. This choice of Docker should not be construed to limit embodiments of the present invention to the Docker platform. The underlying inventive concept and novel features of the present invention may be adapted to any other analogous container service or platform.

FIG. 2 illustrates a method for adding conditional deployment capabilities to a container system by adding a feature of parallel layers to an image file. Such an enhanced image file is built by running a novel type of Dockerfile to which has been added an ability to add parallel layers to an image file. Here, parallel layers are alternate software layers that share a same level in an image file or a deployed container. In conventional container systems, a container is comprised of a stack of software layers, each of which occupies one layer of the stack. Embodiments of the present invention extend this concept to accommodate parallel layers of an image file that are each associated with a same stack level. When the image file is run, in order to deploy a container, only one candidate parallel layer is selected for each level of the container's stack. In this way, the resulting container still comprises a stack of layers, one layer at each level of the stack. But a choice of which layer occupies each level, which may be made by evaluating predefined conditions at deployment time, allows a single image file to deploy many variations of a container.

This method may be used to enhance an existing "base," standard, or template Dockerfile that may have been retrieved from an existing repository or that had been previously crated for a similar deployment. Embodiments of the present invention merely add one new class of instruction to the Dockerfile instruction set in order to allow the Dockerfile to add parallel layers to an image file. Embodiments may use a procedure analogous to that of FIG. 2 to generate a conditional image file under other container-generating systems or to process other types of existing image-creation files supported by such other systems.

Step 201 initiates an iterative process of steps 203-219. Each iteration of this process processes one instruction of a Dockerfile (or a similar type of image-creation file in a different container system) in the order in which the instructions are listed in the Dockerfile. This procedure continues until the last instruction of the image-creation file is processed.

The processor steps through the Dockerfile instructions in a sequential order, with each instruction adding a new layer to the image file under construction.

Step 203 determines whether the instruction currently being processed creates a parallel (or conditional) layer. In embodiments described herein, these instructions are a novel addition to the instruction set that may be comprised by a Dockerfile (or similar image-creation file). This new instruction type may be added to a container-management system through means known in the art, such as by adding functionality through installation of a plug-in module or extension. Extensions, for example, are particularly attractive under the Docker platform, which is an open-source project that accommodates the addition of functionality in this way.

If the system in step 203 determines that the current instruction is not a conditional instruction, then the method proceeds in a manner that is currently known in the art, unconditionally creating a layer in the image file being built, where that unconditional layer corresponds to the current instruction and is added to the image file at a level that is one higher than that of the previously added layer.

If the system in step 203 determines that the current instruction identifies a parallel layer, then the system continues with the novel procedure of steps 205-215 to add a novel conditional layer to the image file.

In step 205, the system, in response to detecting the conditional Dockerfile instruction, adds a new blank "clone" layer at the topmost level of the image file currently under construction. The parallel layer to be created in the following steps of FIG. 2 will be created by populating this empty layer.

In step 207, the system continues processing the conditional instruction by identifying all file changes that will be required in order to deploy the conditional layer into a container. In some embodiments, depending in part upon the type of container technology or platform being used, the system may in this step identify other types of changes, conditions, or other metadata associated with the new layer. In other embodiments that are similarly based upon container technologies other than Docker, the system may perform steps that are different or analogous to steps 207-211 in order to produce the same operations of creating and possibly adding a new topmost layer of software to an image file. The details of these steps may be implementation-dependent, but do not alter the fundamental inventive concept of steps 205-211.

In step 209, the system configures the new layer on the clone layer created in step 205 by adding images of software identified by the current instruction. If, for example, the current instruction installs an instance of a word processor the new layer may contain or link to a configured, deployable copy of that word processor.

In step 211, if required by the container technology, the system "commits" the new layer by storing the new software layer in an actual image file stored on a storage medium or device. In the Docker system, for example, the system in step 211 might save a data structure on disc that comprises an image of each application, operating system, or tool that might be deployed by the new layer, along with associated data, such as configuration settings. In some embodiments, the system might save storage space by install links to one or more components of the layer instead of the actual components themselves.

In step 213, the system marks the new layer as a "parallel" or conditional layer, using means known in the art. Such means might, for example, comprise setting a flag bit in a data structure, updating a field of a database, revising metadata associated with the new layer or with a level at which the layer would be deployed, or naming a related file according to a certain file-naming convention.

In step 215, additional metadata associated with the new layer is identified, formatted, and saved. Such metadata may comprise one or more identifications of: a level of the new layer; a condition under which the layer should be deployed into a deployed container; one or more layers that must be inserted, or may only be inserted, into a deployed container if the conditional layer is inserted; minimum or maximum resource requirements; operating system settings or other environmental settings associated with the deployed layer; dependency relationships among software entities comprised by the layer; or any other information that, as a function of implementation details, is deemed necessary in order to properly deploy the layer or to determine whether to deploy the layer.

In one example, if the Dockerfile being processed creates an image file that may deploy one of three possible "parallel" layers on level 4 of a container instance, each of those three conditional level-4 layers may correspond to one of three conditional statements in the Docker file. In such a case, in order to distinguish such parallel layers from unconditional layers that would instead be stacked on top of each other at three distinct adjacent levels, each of those parallel layers would be associated with metadata that identifies it as being associated with a same level 4. In some embodiments, this metadata might be embedded into a Dockerfile instruction, or into one or more predefined application images that are to be incorporated into a newly created parallel layer.

The system performs steps 217 and 219 if the system in step 203 determines that the current instruction is not a conditional instruction.

In step 217, the system creates and configures a new layer in accordance with standard procedures normally associated with Docker or an other container technology. These standard procedures may be similar to those of steep 205 and 209.

In step 219, the system "commits" or otherwise stores the layer in the image file currently being built. This layer would be committed to a level one higher than the level of the most recently created previous conditional or nonconditional layer.

At the conclusion of the last iteration of the procedure of FIG. 2, the system will have built a novel type of image file that may comprise multiple, alternate "parallel" layers that occupy a same stack level. In such cases, conditions evaluated at the time that the image file is used to deploy an instance of a container will determine which of the alternate parallel layers is to be deployed at that particular level.

Figure 3:
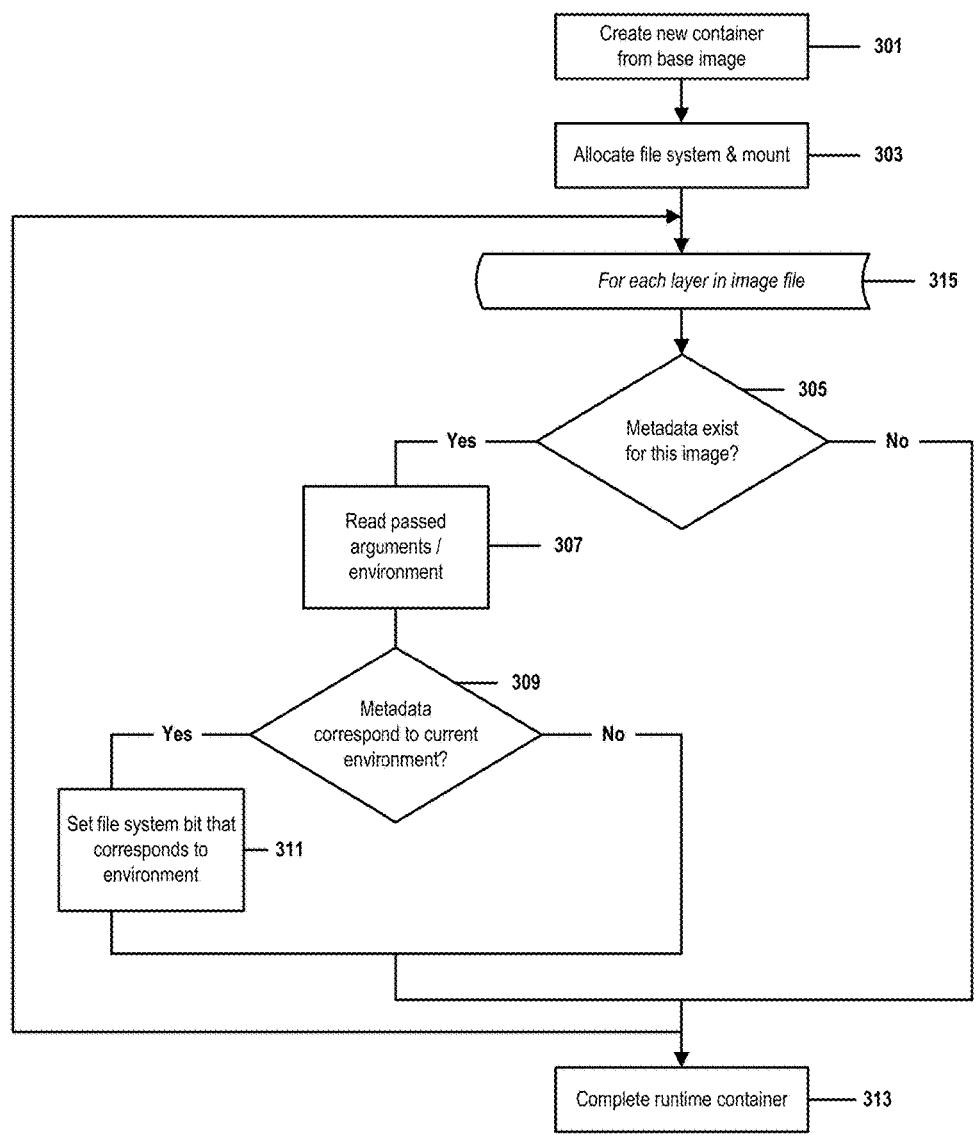
FIG. 3 is a flow chart that shows a method, in accordance with embodiments of the present invention, for deploying a conditional software container as a function of the conditional image created in FIG. 2.

FIG. 3 is a flow chart that shows a method, in accordance with embodiments of the present invention, for deploying a conditional software container as a function of the image file created in FIG. 2. FIG. 3 contains steps 301-315.

In step 301, the system deploys an empty "container" into which will be deployed layers of the image file created by the method of FIG. 2. This container may be deployed in a virtualized computing environment, such as a cloud-computing platform, or it may be deployed as a virtual resource provisioned directly on physical resources without an intervening hypervisor or other virtualization layer.

In step 303, the system allocates resources of the underlying platform to create and mount a file system within which the container will be deployed. This step reserves physical or virtual resources sufficient to host the container. In some embodiments, this allocation will be performed by deploying an early layer of the image file, where that early layer comprises information required to create and mount a file system for the container.

Step 315 initiates an iterative process of steps 305-311. This process will run once for each parallel or nonconditional layer stored in the enhanced image file created by a method of FIG. 2. Each iteration of this iterative process will either deploy an unconditional layer or determine whether a parallel layer of the image file will be deployed. This iterative process will thus deploy an instance of the container, layer by layer, in order of the deployed layers' levels. In other words, a first iteration of the iterative process will deploy one layer at level 1, a second iteration will deploy one level-2 layer, and so forth.

In step 305, the system determines whether the layer currently being processed is a parallel layer. Although this determination may be made by any means known in the art, in the examples of FIGS. 2 and 3, the system performs this step by determining whether the system created and associated metadata associated with the current layer during a performance of the method of FIG. 2. If the system identifies that such metadata exists, it assumes that the current layer is a parallel layer and performs steps 307-311. Otherwise, the current iteration of the process of step 305-311 terminates. In some embodiments, metadata may be associated with all layers, and step 305 may make its determination by evaluating a specific characteristic of the current layer's metadata. In other embodiments the system make its determination by any other implementation-dependent method that is appropriate to the embodiment.

In step 307, the system reads any passed arguments or environmental variables associated with the current layer. Such arguments may, for example, have been passed as arguments of a command that launches software to process the image file or the Dockerfile that created the image file, or deploy the container. In other cases, the system may retrieve arguments or variables from known logs, configuration files, or other resources in which such arguments or variables may be stored or maintained.

In some embodiments, an analogous step may be performed prior to performing a first iteration of the iterative process of steps 305-311 in order to read global arguments, settings, and variables that are associated with all layers of the container. In other embodiments, the analogous step may be performed instead of one or more iterations of step 305, by reading global arguments, settings, and variables, as well as specific arguments, settings, and variables associated with only one or more specific layers.

In some embodiments, the system may also in this step read metadata stored in FIG. 2, step 215 that is associated with the layer currently being processed.

In step 309, the system determines whether the layer currently being processed satisfies a condition identified by the associated metadata identified in step 305. That condition may have been passed from a corresponding Dockerfile instruction that created the current layer. If that condition is satisfied, the system continues with step 311 in order to ensure that the current layer is instantiated, at a correct level, in the container being deployed by the image file being processed by the method of FIG. 3.

Although the system may use any means known in the art to determine whether a parallel layer currently being processed satisfies its associated condition, in the example of FIG. 3, the system makes this determination by determining whether metadata comprised by or associated with the layer currently being processed associates that layer with a characteristic of the operating environment into which the image file will deploy a container. If, for example, a condition specifies that a parallel layer may be deployed only if the container is deployed under a particular operating system, the system will determine whether the container's operating system is the one specified by the condition.

Step 311 is performed if the system identifies in step 309 that the current layer satisfies the specified condition. The system may perform this identification by any means known in the art, and in the example of FIG. 3, the system may perform this task by setting a bit in a file of the file system allocated in step 303 or by embedding the identification into a data structure comprised by the parallel layer in the image file.

At the conclusion of the final iteration of the iterative process of steps 305-313, the system complets its deployment of the container. Building upon the file system that may have been allocated and mounted in step 303, the system in step 315 deploys all unconditional layers of the, and deploys no more than one parallel layer of the image file at each level of the deployed container. This deployment may, in some embodiments, be performed in an order identified by an order of levels associated with each layer of the image file.

In embodiments described in FIG. 3, the system will in step 313 select which, if any of the conditional parallel layers to deploy at each level by means of the identification of step 311, or by analogous identification means, as described above.

The procedure of FIG. 3 will be performed in order of layer level. That is, it will start with the lowest levels, allocating a file system and operating system, if required, and then proceed level-by-level up the stack of layers in the image file, as ordered by the instruction sequence of the Dockerfile in the method of FIG. 2. At a level that may be comprise any one of several parallel conditional layers, the system will deploy only one layer, which may be selected by steps 309 and 311, and then move on to determine which layer should be deployed at the next highest level.

At the conclusion of this process, an instance of the container will have been fully deployed, where that instance comprising layers that have satisfied any conditions dependent upon characteristics of the container's specific operating environment, intended usage, or other condition capable of being evaluated at time of deployment.

Figure 4A:
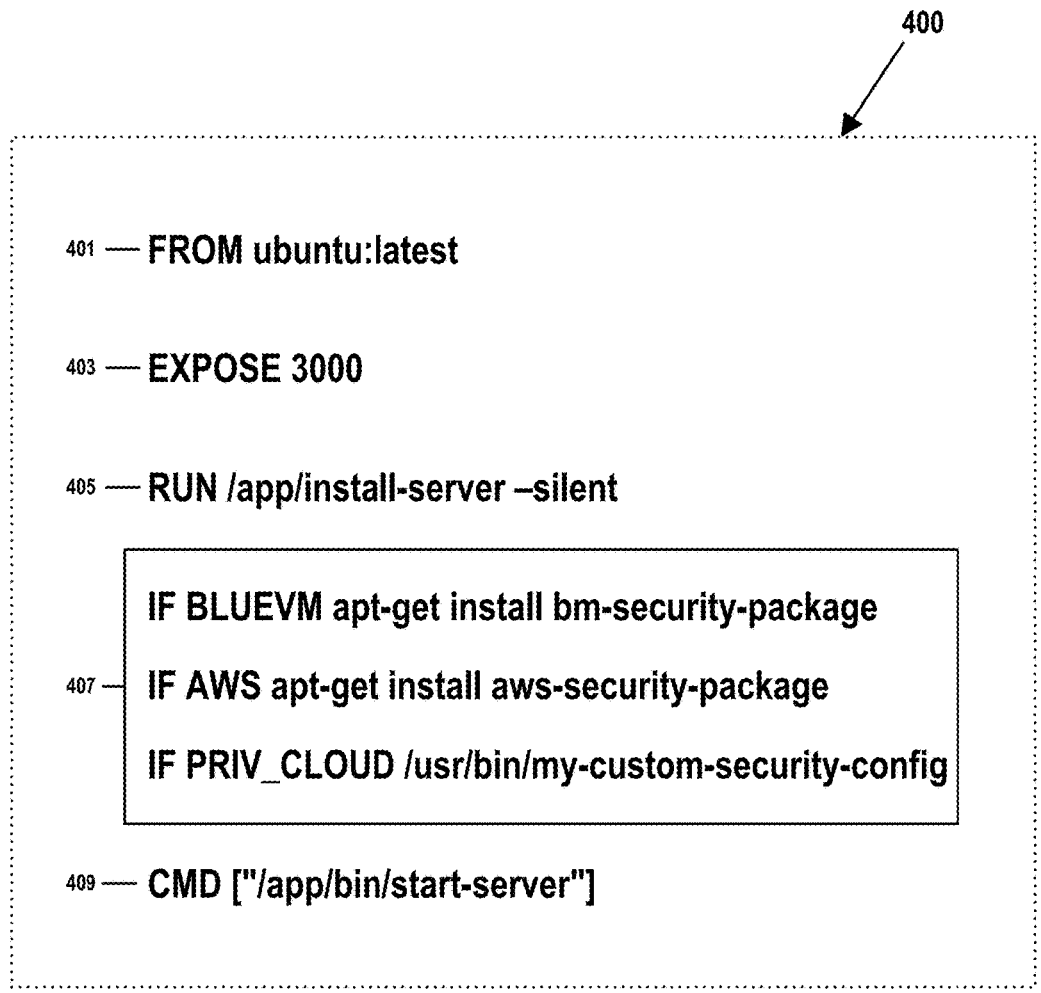
FIG. 4a is a first example of instructions comprised by a conditional image-creation file 400 that is in accordance with embodiments of the present invention.

FIG. 4a is a first example of instructions comprised by a conditional image-creation file 400 that is in accordance with embodiments of the present invention. FIG. 4a references items 400-409.

Item 400 is a list of instructions contained in an image-creation file 400, such as the file processed by the method of FIG. 2. This file contains instructions that create conditional layers in an image file, in accordance with embodiments of the present invention. Running this image file, in turn, deploys an instance of a container that comprises a self-contained operating environment, that may comprise a file system, an operating system, one or more configured applications, data files, and environmental settings.

The image file and each instance are each structured into a stack of layers, where each layer is identified by a level. When the image-creation file 400 is run in order to create an image file, each executable instruction adds a layer to the resulting image file. Layers are added in sequential order, such that the final resulting image file contains a stack of layers organized in a sequence analogous to the sequence of executable instructions 401-409 of image creation file 400.

In some embodiments, the image-creation file 400 may further contain other types of instructions, such as comments, that do not create layers in the image file or in the deployed container.

In embodiments of the present invention, each layer of the final image file is associated with a level. Although a novel feature of the present invention is the concept of parallel layers of the image file that share a same level, when that image file is run in order to deploy an instance of a container, that container will comprise no more than one layer at each level. In cases where several parallel levels of the image file are all associated with a same level, only one of those layers may be deployed when the image file is run, and the layer of the set of parallel layers that is deployed at that level is selected as a function of conditions that are evaluated at the time of deployment. Thus, image-creation file 400 may produce only one image file, but that image file may produce many different instances of a single container. This procedure will be illustrated below in FIGS. 4*b*-4*c* and 5*a*-5*c*.

Items 401-403 are executable instructions that each add a layer to the image file when the image-creation file 400 is run.

Figure 4B:
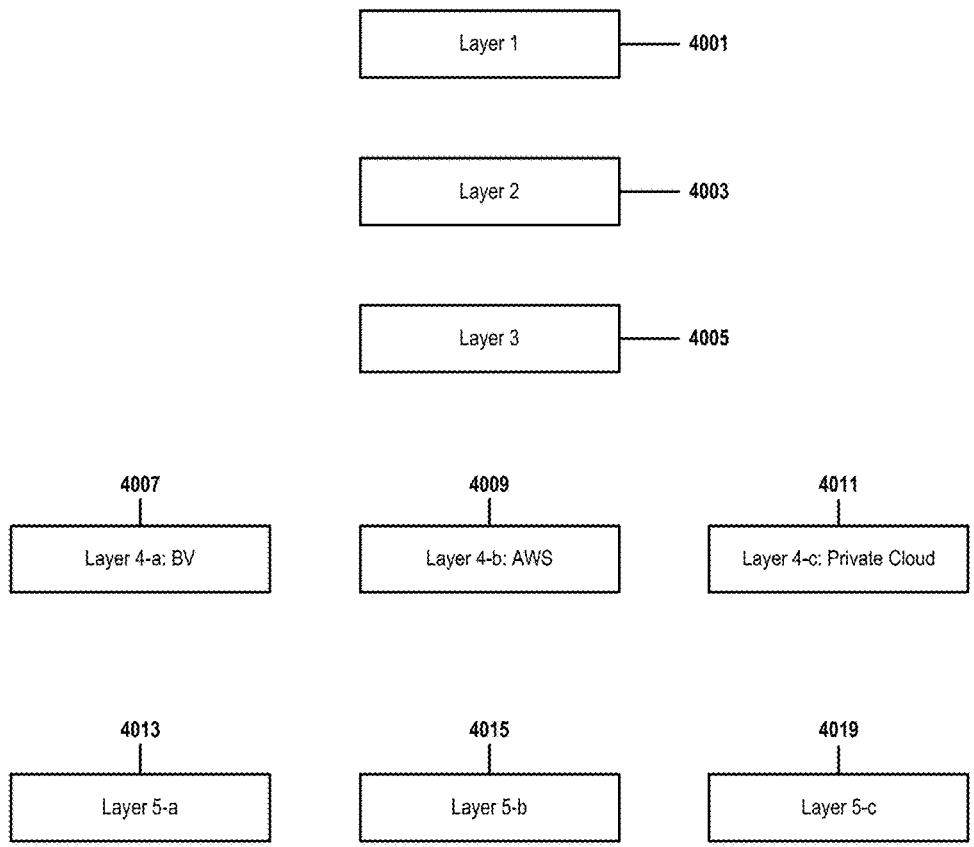
Figure 4C:
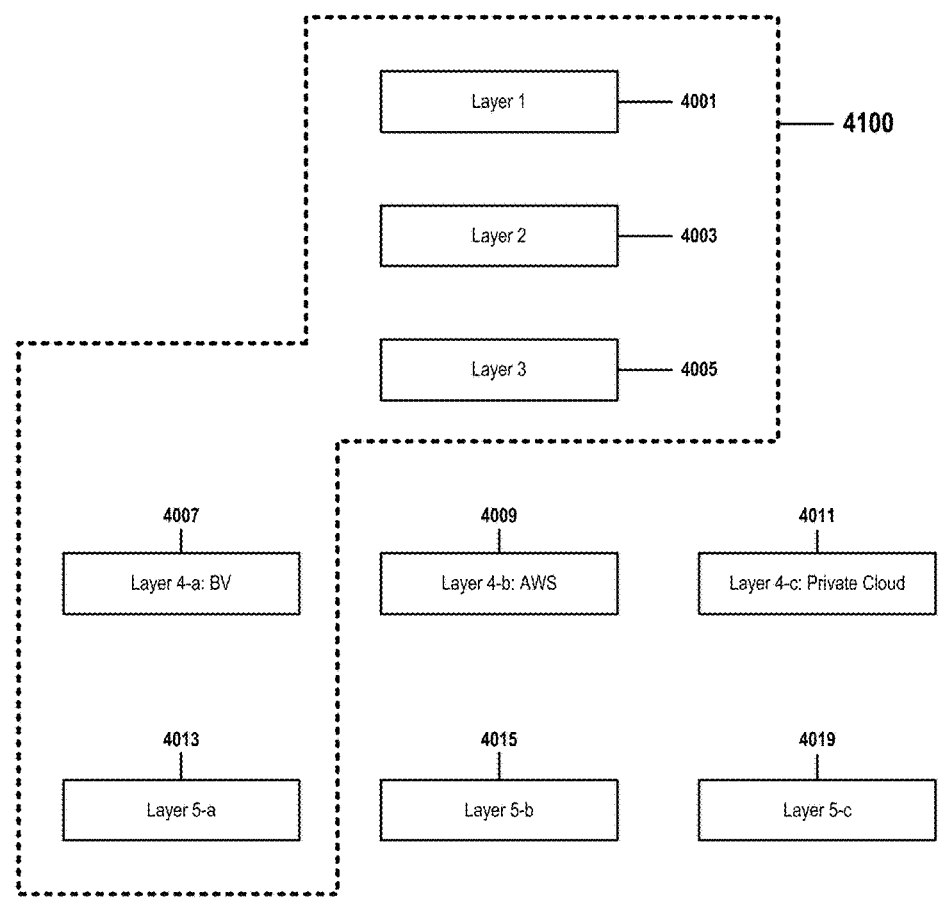
FIG. 4c relates the image-file level structure of FIG. 4b to an instance of a container deployed by methods of FIGS. 2-3.

Item 401 is an instruction of the image-creation file 400 that, when the image-creation file 400 is run, adds an unconditional first layer to the image file. In the example of FIG. 4*a*-4*c*, this layer will be referred to as Layer 1 4001, which will be associated with level 1 of the image file and of all instances of the deployed container created by the image file. In this example, Layer 1 of the deployed container comprises an instance of a Ubuntu operating system.

Item 403 is an instruction of the image-creation file 400 that, when the image-creation file 400 is run, adds an unconditional second layer to the image file. In the example of FIG. 4*a*-4*c*, this layer will be referred to as Layer 2 4003, which will be associated with level 2 of the image file and of all instances of the deployed container created by the image file.

In this example, instruction 403 identifies a software configuration of the container's communications resources (that is, it identifies that the container will communicate with external entities through a port 3000). When the image-creation file 400 is run, this instruction will create an unconditional layer in the image file such that, when the image file is run, will deploy a new Layer 2, at the container's level 2, that will expose port 3000 on the container.

Item 405 is an instruction of the image-creation file 400 that, when the image-creation file 400 is run, adds an unconditional third layer to the image file. In the example of FIG. 4*a*-4*c*, this layer will be referred to as Layer 3 4005, which will be associated with level 3 of the image file and of all instances of the deployed container created by the image file.

In this example, instruction 405 identifies an installation of a "server" software application. When the image-creation file 400 is run, this instruction adds an unconditional layer to the image file such that, when the image file is run, that layer will deploy a new Layer 3, at the container's level 3, that install this server software.

Item 407 comprises three "IF" instructions of the image-creation file 400 that, when the image-creation file 400 is run, each add a parallel layer at level 4 of the image file. Despite terminology used in this document for reasons of clarity and consistency, and further despite the presence of an "IF" operator in these instructions, these instructions are not conditional instructions. In some embodiments may, for example, this type of statement may comprise terminology other than "IF," may be functionally replaced by a "CASE" or "SWITCH" type statement that requires only one statement to create multiple parallel layers, or may identify complex multi-operator logical or arithmetic conditions.

Regardless of such implementation details, the "IF" instructions 407 are not conditional statements because they unconditionally add the same three parallel layers to the image file every time the image-creation file 400 is run. Conditional implementation occurs when the image file is later run in order to deploy an instance of the container. At deployment time, conditions associated with those three parallel layers will each be evaluated to determine which, if any of those layers will be deployed to the specific container instance.

In the example of FIG. 4*a*-4*c*, these three resulting level 4 layers of the image file are referred to as Layer 4-a 4007, Layer 4-b 4009, and Layer 4-c 4011, each of which will be associated with level 4 of the image file and of all instances of the deployed container created by the image file.

In this example, each of the three instructions 407 identify a condition under which the respective parallel level-4 layer each creates in the image file may be deployed in a container.

The first statement of 407, for example, identifies that, if the virtualized operating environment in which an instance of the container is deployed is a system called "BLUEVM," then a layer that installs a BLUEVM-compatible security package will be deployed at level 4 of the container. Similarly, the second statement of 407 identifies that, if the virtualized operating environment in which an instance of the container is deployed is called "AWS," then a layer that installs a AWS-compatible security package will be deployed at level 4 of the container. And the third statement of 407 identifies that, if the virtualized operating environment in which an instance of the container is deployed on a private cloud, then a layer that installs a proprietary or custom security package will be deployed at level 4 of the container.

When the image file is run, embodiments of the present invention will deploy no more than one of these parallel layers at level 4 of the deployed container instance. In some embodiments, this constraint may be guaranteed by the embodiment, but in other embodiments, it may need to be implemented by a configuration of the conditional/parallel image-creation statements 407, such that the conditions evaluated by the statements 407 are mutually exclusive.

Statement 409 is an unconditional instruction of the image-creation file 400 that, when the image-creation file 400 is run, adds an uppermost layer to the image file at level 5. In the example of FIG. 4*a*-4*c*, this will result in the addition of three parallel level-5 layers to the image file.

In this example, the single unconditional statement 409 results in the creation of three parallel level-5 layers because the image file comprises three parallel layers at level 4. In some embodiments, the exact configuration of the level 5 layer may vary as a function of which of the three parallel level-4 layers is chosen.

If, for example, Layer 4-*b* is deployed when the image file is run because the resulting container is being deployed in an AWS environment, the image file will next add a Layer 5-*b*, which is configured to run in the same AWS environment. Thus, three environmental-dependent versions of a level-4 layer identified by unconditional command 409 in the image-creation file 400 must be added to the image file in order to accommodate the three corresponding parallel level-4 layers immediately above the level-5 layers.

Figure 5A:
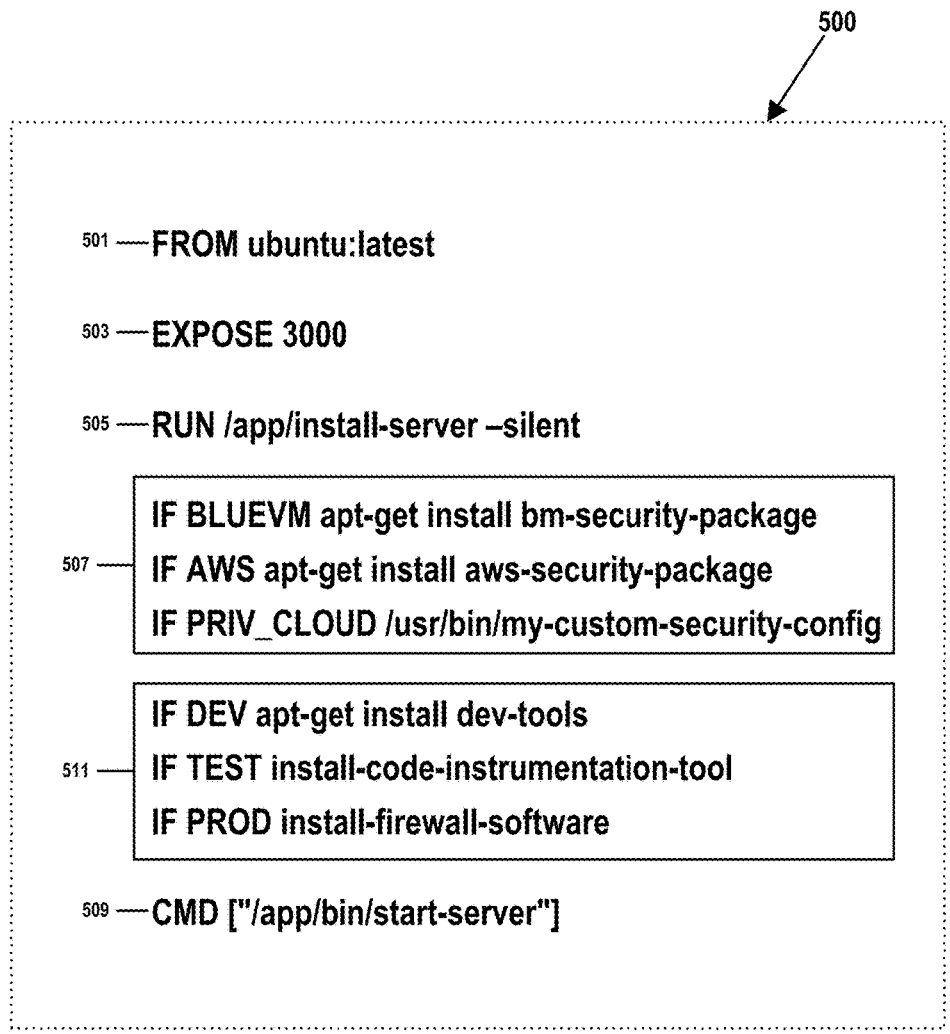
FIG. 5a is a second example of instructions comprised by a conditional image-creation file 500 that is in accordance with embodiments of the present invention.
Figure 5B:
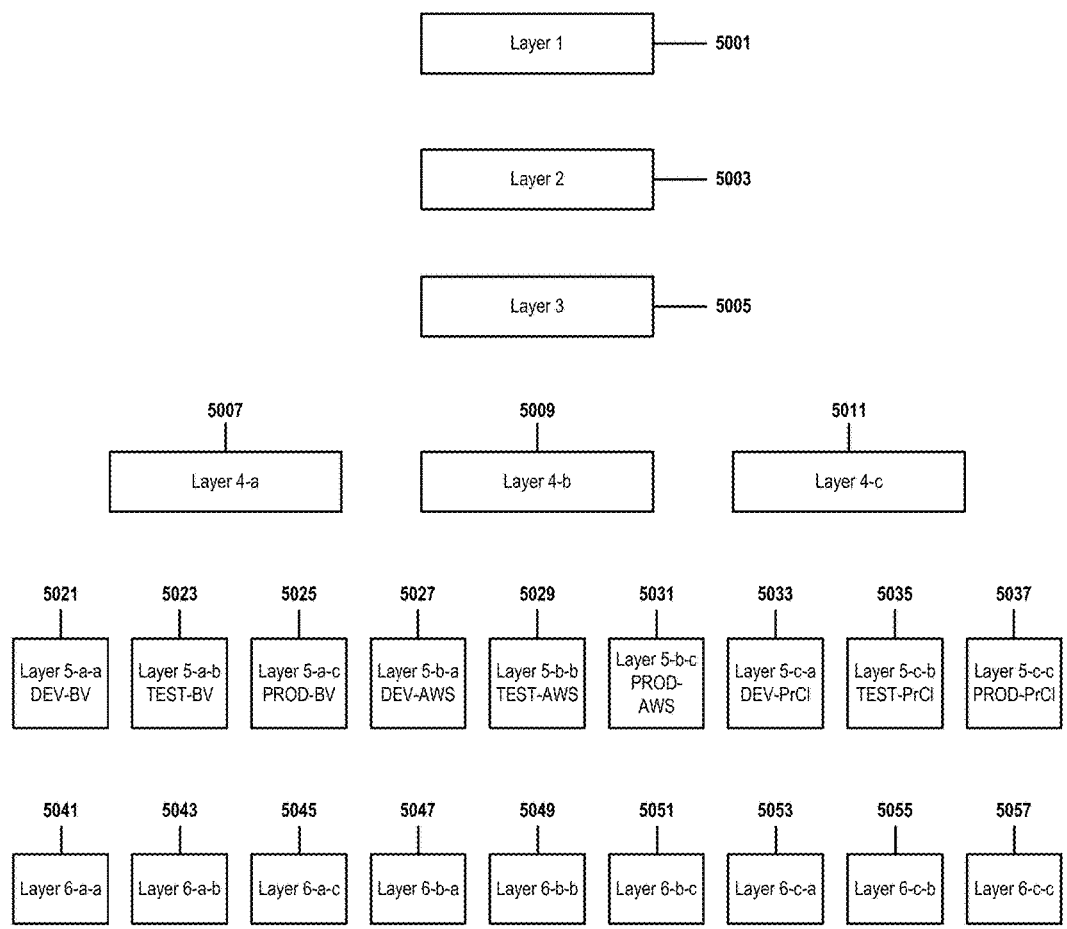
Figure 5C:
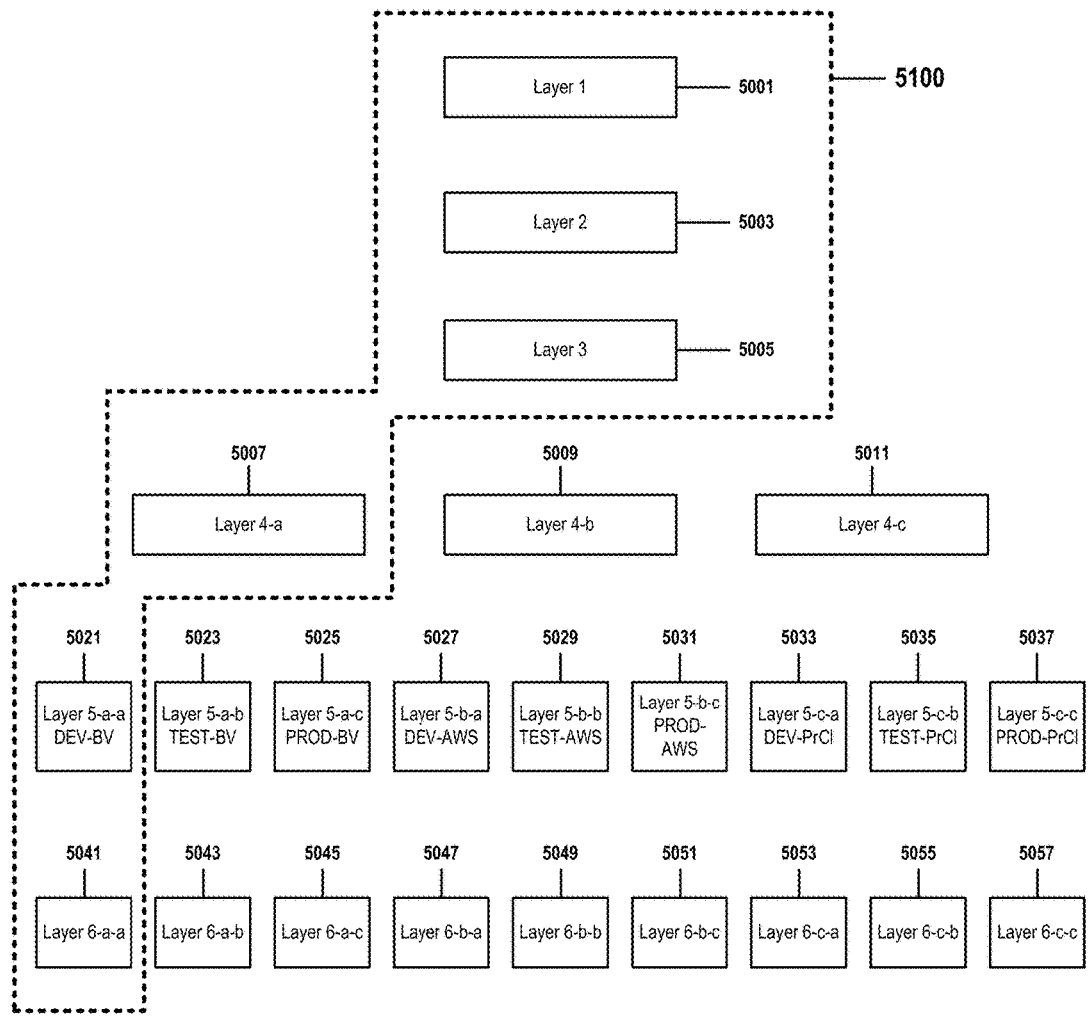
FIG. 5c relates the image-file level structure of FIG. 5b to an instance of a container deployed by methods of FIGS. 2-3.

As will be seen in FIGS. 5*a*-5*c*, when more than one level of an image file comprises multiple parallel layers, the number of layers may quickly multiply.

FIG. 4*b* shows a level structure of an image file created by the image-creation file 400 of FIG. 4*a*. FIG. 4*b* references items 4001-4019.

Items 4001, 4003, and 4005 show, respectively, the three layers added in sequential order to the image file by statements 401, 403, and 405 of the image-creation file 400 of FIG. 4*a*. As explained above, every time the image-creation file 400 is run, the resulting image file will always comprise a corresponding Layer 1 at level 1 of the image file, a corresponding Layer 2 at level 2 of the image file, and a corresponding Layer 3 at level 3 of the image file.

Items 4007, 4009, and 4011 show, respectively, the three parallel layers added in to the image file by statements 407 of the image-creation file 400 of FIG. 4*a*. As explained above, every time the image-creation file 400 is run, the resulting image file will always comprise three parallel layers Layer 4-a, Layer 4-b, and Layer 4-c, all associated with level 4 of the image file.

As explained in FIGS. 2 and 3, these parallel layers may each be associated in the image file with metadata, such as an identification that: the layer is conditional or parallel; the layer, deployed, would be deployed at level 4 of a container instance; that the layer would be deployed only if it satisfies a condition specific to that layer; or other information relevant to deployment, such as configuration or installation settings.

Similarly, items 4013, 4015, and 4019 show, respectively, the three parallel layers added in to the image file by statement 409 of the image-creation file 400 of FIG. 4*a*. As explained above, although statement 409 is not an "IF"-type statement that would specify a condition to be associated with a conditional layer of an image file, statement 409 nonetheless adds one parallel level-5 layer to the image for each parallel branch created by an existence of parallel layers at a previous level.

Thus, since the image file contains three parallel layers at level 4, statement 409 must add one unconditional level-5 layer for each of the level-4 layers. This is necessary because a selection of one of the level-4 layers at deployment time may indicate that a container instance is being deployed in an environment that may affect details of a corresponding level-5 layer. Thus a distinct level-5 layer may be required for each such environment.

In some cases, conditions that result in a choice among multiple level-4 layers may not have any effect upon subsequent layers. In such a case, despite the image file comprising parallel conditional layers at level 4, it may comprise only one layer at level-5 (and higher) levels. Although this scenario may not be common, the image-creation file 400 and image file may, in some embodiments, associate further metadata with the level-5 layer associated with statement 409 that indicates whether that level should be expanded into multiple parallel conditional levels.

FIG. 4*c* relates the image-file level structure of FIG. 4*b* to an instance of a container deployed by methods of FIGS. 2-3. FIG. 4*c* references items 4001-4019 and 4100.

Items 4001-4019 are functionally and structurally identical to similarly numbered items in FIG. 4*b*. As described above, they represent a vertical stack of layers of the image file created by running the image-creation file 400 of FIG. 4*a*. As in FIG. 4*b*, each horizontal row of FIG. 4*c* represents one or more layers at a particular level of the image file.

In this example, the image file is to deploy an instance of the container in a "BLUEVM" virtualized operating environment. In such a case, methods of the present invention would proceed through each layer of the image file in sequential order, first deploying unconditional layers Layer 1 4001, Layer 2 4003, and Layer 3 4005.

The system would then proceed to level 4, selecting Layer 4-a 4007 because Layer 4-a is configured to be deployed under BLUEVM. Layers 4-b 4009 and 4-c 4011 would not be deployed because the container's BLUEVM operating environment does not satisfy conditions associated with those two image-file layers.

Finally, the system would proceed to level 5, selecting Layer 5-a 4013 because Layer 5-a is configured to be deployed when Layer 4-a is deployed under BLUEVM. Layers 5-b 4015 and 5-c 4019 would not be deployed because the container instance does not comprise Layer 4-b 4009 or Layer 4-c 4011.

Item 4100 thus encircles the layers that would be deployed by methods of FIGS. 2-3 when the image file created by image-creation file 400 is run to deploy a container instance within a BLUEVM virtualized computing platform.

FIG. 5*a* is a second example of instructions comprised by a conditional image-creation file 500 that is in accordance with embodiments of the present invention. FIG. 5*a* references items 500-511.

Item 500 is a list of instructions contained in an image-creation file 500, such as the file processed by the method of FIG. 2. This file differs from the similar image-creation file 500 described in FIG. 4*a* only in that it comprises a second set of "IF" instructions 511 that add a second level of parallel layers to an image file.

Items 500-509 are analogous in form and function to the analogously numbered items 400-409 of FIG. 4*a*. Descriptions of items 400-409 thus apply to analogous items 500-509 in FIG. 5*a*.

As was the case with the image-creation file 400 of FIG. 4*a*, the image file and each container instance that are directly or indirectly created here by image-creation file 500 are each structured into a stack of layers, where each layer is identified by a level. When the image-creation file 500 is run in order to create an image file, each executable instruction of the image-creation file 500 adds a layer to the image file. Layers are added in sequential order, such that the final resulting image file contains a stack of layers organized in a sequence analogous to the sequence of executable instructions 501-511 of image creation file 500.

In embodiments of the present invention, each layer of the final image file is associated with a level. Although a novel feature of the present invention is the concept of parallel layers of an image file that share a same level, when such an image file is run in order to deploy an instance of a container, that container will comprise no more than one layer at each level. In cases where several parallel levels of the image file are all associated with a same level, only one of those layers may be deployed when the image file is run, and the layer of the set of parallel layers that is deployed at that level is selected as a function of conditions that are evaluated at the time of deployment. Thus, image-creation file 500 may produce only one image file, but that image file may produce many different instances of a single container. This procedure will be illustrated below in FIGS. 5*b*-5*c*.

As did statements 401-403 of FIG. 4*a*, statements 501-503 are executable instructions that each add a layer to the image file when the image-creation file 500 is run. Statement 501 adds an unconditional first layer to the image file that, in FIGS. 5*b* and 5*c* are referred to as Layer 1 5001, and which is associated with level 1 of the image file and of all instances of the deployed container created by the image file.

Similarly, statement 503 adds an second first layer to the image file that, in FIGS. 5*b* and 5*c* are referred to as Layer 1 5003, and which is associated with level 2 of the image file and of all instances of the deployed container created by the image file. Finally, statement 505 adds a third first layer to the image file that, in FIGS. 5*b* and 5*c* are referred to as Layer 3 5005, and which is associated with level 3 of the image file and of all instances of the deployed container created by the image file.

As did item 407 of FIG. 4*a*, item 507 of FIG. 5*a* comprises three "IF" instructions of the image-creation file 500 that, when the image-creation file 500 is run, each add a parallel layer at level 5 of the image file. As with the "IF" instructions of item 407, these instructions are not conditional instructions. They add the same three parallel level-4 layers to the image file every time that the image-creation file 500 is run. Conditional implementation occurs when the image file is later run in order to deploy an instance of the container.

In the example of FIG. 5*a*-5*c*, these three resulting level 4 layers of the image file are referred to as Layer 4-a 5007, Layer 4-b 5009, and Layer 4-c 5011 of FIG. 5*b*, each of which will be associated with level 4 of the image file and with level 4 of all instances of the deployed container created by the image file. Here, Layers 4-a 5007, 4-b 5009, and 4-c 5011 are similar in form and function to Layers 4-a 4007, 4-b 4009, and 4-c 4011 of FIGS. 4*a*-4*c*.

Statements 511 identify another set of parallel layers that are each associated with a condition related to a type of functional environment, respectively, Development, Test, or Production. As was illustrated by the description of statements 407 and 409, and their corresponding layers 4007-4019, each of the statements 511 will add a level-5 layer to the image file for each parallel level-4 layer 5007-5011 of FIG. 5*b*. As will be seen in FIG. 5*b*, this will result in nine parallel level-5 layers 5021-5037.

Statement 509 is an unconditional instruction of the image-creation file 500 that, when the image-creation file 500 is run, adds an uppermost (level-6) layer to the image file above each level-5 layer 5021-5037.

In this example, the single unconditional statement 509 thus results in the creation of nine parallel level-5 layers, one for each of the nine parallel layers 5021-5037 at level 5. In some embodiments, the exact configuration of a level-6 layer may vary as a function of which of the nine parallel level-5 layers is deployed to the container instance when the image file is run.

If, for example, Layer 5-*b* 5009 is deployed when the image file is run to deploy a container instance in an AWS environment, the image file will next add a Layer 5-b-a 5027, Layer 5-b-b 5029, or Layer 5-b-c 5031, all of which are configured to run in the same AWS environment. The system will select which one of these three layers to deploy as a function of the respective conditions identified by each of the image-creation file statements 511.

In this case, the system will deploy Layer 5-b-a 5027 if the image file is creating a container intended to run in a product-development environment under AWS, it will deploy Layer 5-b-b 5029 if the image file is creating a container intended to run in a product-test environment under AWS, and it will deploy Layer 5-b-c 5031 if the image file is creating a container intended to run in a production environment under AWS.

As was the case with statement 409 of FIG. 4*a*, unconditional statement 509 will add one additional layer to each possible container instance identified by the image file. Each of these layers will occupy the uppermost level of the resulting deployed container and will In the example of FIG. 5*a*-5*c*, this will result in the addition of nine parallel level-6 layers 5041-5057 to the image file. Each of these level-6 layers 5041-5057 will be compatible with a corresponding level-5 layer 5021-5037 immediately below it.

FIG. 5*b* shows a level structure of an image file created by the image-creation file 500 of FIG. 5*a*. FIG. 5*b* references items 5001-5057.

Items 5001-5011 show layers added to an image file at levels 1-4 by running the image-creation file 500 of FIG. 5*a*. Layers 5001-5011 are similar, respectively in form and function to analogous layers 4001-4011 of FIG. 4*b*. Layers 5001-5005, at levels 1-3, are unconditional layers created by statements 501-505, and layers 5007-5011 are parallel layers at level 4 created by statements 507.

As described in FIG. 5*a*, level-5 layers 5021-5037 are parallel or conditional layers that are created by statements 511. Each of the three statements 511 creates a parallel level-5 layer one level above a corresponding level-4 layer 5007-5011.

For example, level 4 Layer 4-a 5007, which is deployed by the image file into containers deployed in a "BLUEVM" environment, corresponds to three level 5 layers Layer 5-a-a 5021, Layer 5-a-b 5023, and Layers 5-a-c 5025. These three layers are selected, respectively, when the image file is run to deploy a container in a development environment under BLUEVM, a test environment under BLUEVM, and a production environment under BLUEVM.

Similarly, nine level-6 layers 5041-5057 are, nine parallel layers added in to the image file by statement 509 of the image-creation file 500 of FIG. 5*a*. As explained above, although statement 509 is not an "IF"-type statement that would associate a condition with a conditional parallel layer of an image file, statement 509 nonetheless adds one parallel level-6 layer to the image for each parallel layer comprised by the image file at the next lowest level.

Thus, since the image file contains nine parallel layers at level 5, statement 509 must add one unconditional level-6 layer for each corresponding level-5 layer. This ensures that a distinct level-6 layer may be deployed for each possible combination of conditions that identify a distinct level 6 environment.

FIG. 5*c* relates the image-file level structure of FIG. 5*b* to an instance of a container deployed by methods of FIGS. 2-3. FIG. 5*c* references items 5001-5057 and 5100.

Items 5001-5057 are functionally and structurally identical to similarly numbered items in FIG. 5*b*. As described above, they represent a vertical stack of layers of the image file created by running the image-creation file 500 of FIG. 5*a*. As in FIG. 5*b*, each horizontal row of FIG. 5*c* represents one layer, or a set of parallel layers, that share a particular level of the image file.

In this example, the image file is to deploy an instance of the container as a development environment under the "BLUEVM" virtualized operating environment. In such a case, as in FIG. 4a, methods of the present invention would proceed through each layer of the image file in sequential order, first deploying unconditional layers Layer 1 5001, Layer 2 5003, and Layer 3 5005.

The system would then continue to process each layer of the image file in sequential order of layer levels. Proceeding to level 4, the system Layer 4-a 5007 because Layer 4-a is configured to be deployed under the BLUEVM environment Layers 4-b 5009 and 4-c 5011 would not be deployed because the container's BLUEVM operating environment does not satisfy conditions associated with those two conditional parallel layers of the image file.

Similarly, the system would select Layer 5-a-a 5021 at level 5 because Layer 5-a-a is associated with a first condition of a deployment under BLUEVM and a second condition of a deployment into a production environment. The other eight level-5 parallel layers 5021-5037 would not be selected because none of them are conditioned upon a deployment into a BLUEVM production environment.

Finally, the system would proceed to level 6, selecting Layer 6-a-a 5041 because Layer 5-a is configured to be deployed when Layer 5-a-a 5021 is deployed under a BLUEVM-hosted production environment. The other eight level-6 parallel layers 5043-5057 would not be selected because none of them satisfy the same conditions required for deployment of the selected level-5 Layer 5-a-a 5021.

Item 5100 thus encircles the layers that would be deployed by methods of FIGS. 2-3 when the image file created by image-creation file 500 is run to deploy a container instance that installs an application to be used for product development on a BLUEVM virtualized computing platform.

What is claimed is:

1. A dynamic container system comprising a processor, a memory coupled to the processor, and a computer-readable hardware storage device coupled to the processor, the storage device containing program code configured to be run by the processor via the memory to implement a method for dynamic container deployment with parallel layers, the method comprising:
the processor processing instructions of an image-creation file that, when run, create an image file configured to deploy instances of a container,
where each instance of the container comprises an ordered stack of layers selected from a set of deployable software layers,
where each level of an ordered set of stack levels identifies one distinct layer of the ordered stack of layers,
where each processed instruction of the image-creation file identifies a candidate layer that is capable of being deployed in one or more instances of the container,
where each candidate layer is either an unconditional layer or a parallel layer,
where a first processed instruction of the image-creation file identifies a first parallel layer of the set of deployable software layers that is associated with a first corresponding level of the ordered set of stack levels,
where a first instance of the container comprises the first parallel layer only if the first instance is deployed on a virtualized platform that satisfies a condition associated with the first processed instruction, and
wherein the processor deploying the first instance on the virtualized platform by processing the image file, where the deploying comprises:
the processor evaluating each layer of the image file in sequential order;
the processor, if the evaluating comprises deploying a software layer to the first instance, associating that software layer with a level that is one greater than the highest level associated with a layer most recently deployed to the first instance.

2. The container system of claim 1, where the instructions are ordered within the image-creation file such that each instruction is associated with a level that is no less than a level associated with an immediately preceding instruction.

3. The container system of claim 1, where the processor processing the first processed instruction further comprises:
the processor determining that the first parallel layer is a conditional layer;
the processor further determining that the virtualized platform satisfies the condition;
the processor adding a new layer to the image file;
the processor populating the new layer with software comprised by the first parallel layer;
the processor associating the new layer with the first corresponding level; and
the processor associating the new layer with a set of metadata elements identified by the first processed instruction.

4. The container system of claim 1, further comprising:
the processor processing a second processed instruction of the image-creation file that identifies a second layer of software and a second corresponding level of the ordered set of stack levels;
the processor determining that the second layer is not a parallel layer;
the processor adding a new layer to the image file;
the processor populating the new layer with software comprised by the second layer; and
the processor associating the new layer with the second corresponding level.

5. The container system of claim 1, where the evaluating each layer of the image file further comprises:
the processor determining whether an evaluated layer of the image file is a parallel layer, where the evaluated layer was added to the image file as a function of a second processed instruction of the image-creation file;
the processor, if determining that the first evaluated layer is not a parallel layer, deploying the evaluated layer as a new layer of the first instance; and
the processor, if determining that the first evaluated layer is a parallel layer, deploying the evaluated layer as a new layer of the first instance only if the virtualized platform satisfies a condition associated with the second processed instruction.

6. The container system of claim 1, where the condition specifies a second layer of the set of deployable software layers and states that the first parallel layer may be deployed to the first instance only if the second layer has already been deployed to the first instance.

7. The container system of claim 1, where the condition specifies a second layer of the set of deployable software layers and states that the first parallel layer must be deployed to the first instance if the second layer has already been deployed to the first instance.

8. The container system of claim 1, where the first processed instruction is associated with a set of metadata elements that comprise: an identification of the first corresponding level; an indication that the first parallel layer is a parallel layer; a configuration setting associated with the first corresponding level; and a characteristic of the virtual platform.

9. A method for dynamic container deployment with parallel layers, the method comprising:
   a processor of a computerized dynamic container system processing instructions of an image-creation file that, when run, create an image file configured to deploy instances of a container,
   where each instance of the container comprises an ordered stack of layers selected from a set of deployable software layers,
   where each level of an ordered set of stack levels identifies one distinct layer of the ordered stack of layers,
   where each processed instruction of the image-creation file identifies a candidate layer that is capable of being deployed in one or more instances of the container,
   where each candidate layer is either an unconditional layer or a parallel layer, where a first processed instruction of the image-creation file identifies a first parallel layer of the set of deployable software layers that is associated with a first corresponding level of the ordered set of stack levels,
   where a first instance of the container comprises the first parallel layer only if the first instance is deployed on a virtualized platform that satisfies a condition associated with the first processed instruction, and
   wherein the processor deploying the first instance on the virtualized platform by processing the image file, where the deploying comprises:
   the processor evaluating each layer of the image file in sequential order;
   the processor, if the evaluating comprises deploying a software layer to the first instance, associating that software layer with a level that is one greater than the highest level associated with a layer most recently deployed to the first instance.

10. The method of claim 9, where the processor processing the first processed instruction further comprises:
    the processor determining that the first parallel layer is a conditional layer;
    the processor further determining that the virtualized platform satisfies the condition;
    the processor adding a new layer to the image file;
    the processor populating the new layer with software comprised by the first parallel layer;
    the processor associating the new layer with the first corresponding level; and
    the processor associating the new layer with a set of metadata elements identified by the first processed instruction.

11. The method of claim 9, further comprising:
    the processor processing a second processed instruction of the image-creation file that identifies a second layer of software and a second corresponding level of the ordered set of stack levels;
    the processor determining that the second layer is not a parallel layer;
    the processor adding a new layer to the image file;
    the processor populating the new layer with software comprised by the second layer; and
    the processor associating the new layer with the second corresponding level.

12. The method of claim 9, where the evaluating each layer of the image file further comprises:
    the processor determining whether an evaluated layer of the image file is a parallel layer, where the evaluated layer was added to the image file as a function of a second processed instruction of the image-creation file;
    the processor, if determining that the first evaluated layer is not a parallel layer, deploying the evaluated layer as a new layer of the first instance; and
    the processor, if determining that the first evaluated layer is a parallel layer, deploying the evaluated layer as a new layer of the first instance only if the virtualized platform satisfies a condition associated with the second processed instruction.

13. The method of claim 9, further comprising providing at least one support service for at least one of creating, integrating, hosting, maintaining, and deploying computer-readable program code in the computer system, wherein the computer-readable program code in combination with the computer system is configured to implement the processing instructions of an image-creation file.

14. A computer program product, comprising a computer-readable hardware storage device having a computer-readable program code stored therein, the program code configured to be executed by a dynamic container system comprising a processor, a memory coupled to the processor, and a computer-readable hardware storage device coupled to the processor, the storage device containing program code configured to be run by the processor via the memory to implement a method for dynamic container deployment with parallel layers, the method comprising:
    the processor processing instructions of an image-creation file that, when run, create an image file configured to deploy instances of a container,
    where each instance of the container comprises an ordered stack of layers selected from a set of deployable software layers,
    where each level of an ordered set of stack levels identifies one distinct layer of the ordered stack of layers,
    where each processed instruction of the image-creation file identifies a candidate layer that is capable of being deployed in one or more instances of the container,
    where each candidate layer is either an unconditional layer or a parallel layer,
    where a first processed instruction of the image-creation file identifies a first parallel layer of the set of deployable software layers that is associated with a first corresponding level of the ordered set of stack levels,
    where a first instance of the container comprises the first parallel layer only if the first instance is deployed on a virtualized platform that satisfies a condition associated with the first processed instruction, and
    wherein the processor deploying the first instance on the virtualized platform by processing the image file, where the deploying comprises:
    the processor evaluating each layer of the image file in sequential order;
    the processor, if the evaluating comprises deploying a software layer to the first instance, associating that software layer with a level that is one greater than the highest level associated with a layer most recently deployed to the first instance.

15. The computer program product of claim 14, where the processor processing the first processed instruction further comprises:
    the processor determining that the first parallel layer is a conditional layer;
    the processor further determining that the virtualized platform satisfies the condition;

the processor adding a new layer to the image file;

the processor populating the new layer with software comprised by the first parallel layer;

the processor associating the new layer with the first corresponding level; and the processor associating the new layer with a set of metadata elements identified by the first processed instruction.

16. The computer program product of claim 14, further comprising:

the processor processing a second processed instruction of the image-creation file that identifies a second layer of software and a second corresponding level of the ordered set of stack levels;

the processor determining that the second layer is not a parallel layer;

the processor adding a new layer to the image file;

the processor populating the new layer with software comprised by the second layer; and the processor associating the new layer with the second corresponding level.

17. The computer program product of claim 14, where the evaluating each layer of the image file further comprises:

the processor determining whether an evaluated layer of the image file is a parallel layer, where the evaluated layer was added to the image file as a function of a second processed instruction of the image-creation file;

the processor, if determining that the first evaluated layer is not a parallel layer, deploying the evaluated layer as a new layer of the first instance; and the processor, if determining that the first evaluated layer is a parallel layer, deploying the evaluated layer as a new layer of the first instance only if the virtualized platform satisfies a condition associated with the second processed instruction.

\* \* \* \* \*